US011485348B2

(12) United States Patent
Sugimoto (10) Patent No.: US 11,485,348 B2
(45) Date of Patent: Nov. 1, 2022

(54) HYBRID VEHICLE CONTROLLER AND HYBRID VEHICLE

(71) Applicant: TOYOTA JIDOSHA KABUSHIKI KAISHA, Aichi-ken (JP)

(72) Inventor: Hitoki Sugimoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/475,344

(22) Filed: Sep. 15, 2021

(65) Prior Publication Data

US 2022/0118963 A1 Apr. 21, 2022

(30) Foreign Application Priority Data

Oct. 16, 2020 (JP) .............................. JP2020-174605

(51) Int. Cl.
*F02D 41/02* (2006.01)
*B60W 20/10* (2016.01)
*B60K 6/24* (2007.10)
*B60W 50/14* (2020.01)
*F01N 3/023* (2006.01)

(52) U.S. Cl.
CPC .............. *B60W 20/10* (2013.01); *B60K 6/24* (2013.01); *B60W 50/14* (2013.01); *F01N 3/023* (2013.01); *B60W 2050/146* (2013.01); *B60W 2510/0657* (2013.01); *B60W 2540/215* (2020.02); *B60W 2710/0666* (2013.01)

(58) Field of Classification Search
CPC .. B60W 30/182; B60W 50/082; B60W 50/14; B60W 10/06; B60W 10/08; B60W 10/30; B60W 2050/146; B60W 20/16; B60W 2530/12; B60Y 2300/476; F02D 2041/026; F02D 2041/228; F02D 2200/0812; F02D 41/024; F02D 41/029; F02D 41/22; Y02T 10/6286; Y02T 10/84

See application file for complete search history.

(56) References Cited

U.S. PATENT DOCUMENTS

2018/0163603 A1* 6/2018 Motegi .................. F01N 3/023
2018/0274673 A1* 9/2018 Sugai .................. F16H 61/0248
2018/0283301 A1 10/2018 Higa et al.
2019/0093533 A1* 3/2019 Kobashi .............. F02D 41/1408

(Continued)

FOREIGN PATENT DOCUMENTS

JP         2018167618 A         11/2018

*Primary Examiner* — John Kwon
(74) *Attorney, Agent, or Firm* — Hauptman Ham, LLP (57) ABSTRACT

A hybrid vehicle controller includes processing circuitry configured to execute a particulate matter (PM) deposition amount estimation process that estimates a deposition amount of PM deposited in the filter. The processing circuitry is configured to switch between a first mode and a second mode as a control mode that defines control of the engine and the motor. A use of the engine is limited in the first mode as compared with the second mode. The processing circuitry is configured to execute a display process that notifies a user that the filter needs to be regenerated when the control mode is the second mode if the estimated deposition amount is greater than or equal to a predetermined amount, and not to execute the display process when the control mode is the first mode even if the deposition amount is greater than or equal to the predetermined amount.

7 Claims, 5 Drawing Sheets

(56) References Cited

U.S. PATENT DOCUMENTS

| | | | |
|---|---|---|---|
| 2020/0141341 A1* | 5/2020 | Muta | B60L 50/66 |
| 2021/0207510 A1* | 7/2021 | Nishizawa | B01D 53/9495 |
| 2021/0254524 A1* | 8/2021 | Nishizawa | F01N 3/103 |
| 2022/0219675 A1* | 7/2022 | Miura | F02D 41/029 |

* cited by examiner

HYBRID VEHICLE CONTROLLER AND HYBRID VEHICLE

RELATED APPLICATIONS

The present application claims priority of Japanese Application Number 2020-174605 filed on Oct. 16, 2020, the disclosure of which is hereby incorporated by reference herein in its entirety.

BACKGROUND

1. Field

The present disclosure relates to a hybrid vehicle controller and a hybrid vehicle.

2. Description of Related Art

The hybrid vehicle described in Japanese Laid-Open Patent Publication No. 2018-167618 includes an engine having a filter for removing particulate matter (PM) contained in exhaust, and a motor for driving the hybrid vehicle. Further, the hybrid vehicle includes a controller that controls the engine according to a mode selected from a plurality of modes. The plurality of modes include a normal mode, an economy mode that limits the engine output compared to the normal mode, and a sport mode that increases the engine output compared to the normal mode. When the deposition amount of the particulate matter in the filter is greater than or equal to the threshold value, the controller notifies the driver that the filter needs to be regenerated and prompts the driver to drive in the sport mode. In sport mode, for example, the engine is operated under high load and the exhaust temperature rises. This raises the temperature of the filter and burns the particulate matter deposited on the filter.

Notifying the driver that the filter needs to be regenerated may not be desirable during normal mode or economy mode. As mentioned above, active use of the engine is needed to regenerate the filter. In the normal mode and the economy mode, the use of the engine is limited compared to sport mode. Therefore, regenerating the filter in the normal mode and the economy mode is difficult. That is, in order to regenerate the filter using the engine, changing from the normal mode or the economy mode to the sport mode is needed. In other words, regenerating the filter when maintaining the normal mode or the economy mode is difficult. Therefore, if the driver is notified that the filter needs to be regenerated in the normal mode or the economy mode, the driver may feel uneasy. Such a problem can also occur in a hybrid vehicle having a Charge Depleting (CD) mode in which the engine is stopped and the hybrid vehicle is driven by a motor, and a Charge Sustaining (CS) mode in which the engine can be used. A similar problem can occur in a hybrid vehicle having a first mode that limits the use of the engine to the extent that the filter cannot be sufficiently regenerated and a second mode that allows the use of the engine to the extent that the filter can be regenerated.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In at least one general aspect, a hybrid vehicle controller is provided. The hybrid vehicle controller is configured to control a hybrid vehicle including an engine including a filter configured to remove a particulate matter (PM) contained in an exhaust and a motor configured to drive the hybrid vehicle. The hybrid vehicle controller includes processing circuitry. The processing circuitry is configured to execute a PM deposition amount estimation process that estimates a deposition amount of PM deposited in the filter. The processing circuitry is configured to switch between a first mode and a second mode as a control mode that defines control of the engine and the motor. A use of the engine is limited in the first mode as compared with the second mode. The processing circuitry is configured to execute a display process that notifies a user that the filter needs to be regenerated when the control mode is the second mode if the estimated deposition amount is greater than or equal to a predetermined amount, and not to execute the display process when the control mode is the first mode even if the deposition amount is greater than or equal to the predetermined amount.

In at least one general aspect, a hybrid vehicle is provided. The hybrid vehicle includes an engine configured to drive the hybrid vehicle, a filter configured to remove particulate matter (PM) contained in an exhaust from the engine, a motor configured to drive the hybrid vehicle, and a controller including processing circuitry. The processing circuitry is configured to execute a PM deposition amount estimation process that estimates a deposition amount of the PM deposited in the filter, switch between a first mode and a second mode as a control mode that defines control of the engine and the motor, an output of the engine being limited in the first mode as compared with the second mode, execute a process that notifies a user that the filter needs to be regenerated when the control mode is the second mode if the estimated deposition amount is greater than or equal to a predetermined amount, and does not notify the user when the control mode is the first mode even if the deposition amount is greater than or equal to the predetermined amount.

In at least one general aspect, a hybrid vehicle controller is provided. The hybrid vehicle controller includes processing circuitry. The processing circuitry is configured to execute a particulate matter (PM) deposition amount estimation process that estimates a deposition amount of PM deposited in a filter, switch between a first mode and a second mode as a control mode that defines control of an engine and a motor, an output of the engine being limited in the first mode as compared with the second mode, execute a process that notifies a user that the filter needs to be regenerated when the control mode is the second mode if the estimated deposition amount is greater than or equal to a predetermined amount, and does not notify the user when the control mode is the first mode even if the deposition amount is greater than or equal to the predetermined amount.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Hereinafter, a controller 39, which is a hybrid vehicle controller according to at least one embodiment, will be described with reference to FIGS. 1 to 4.

Figure 1:
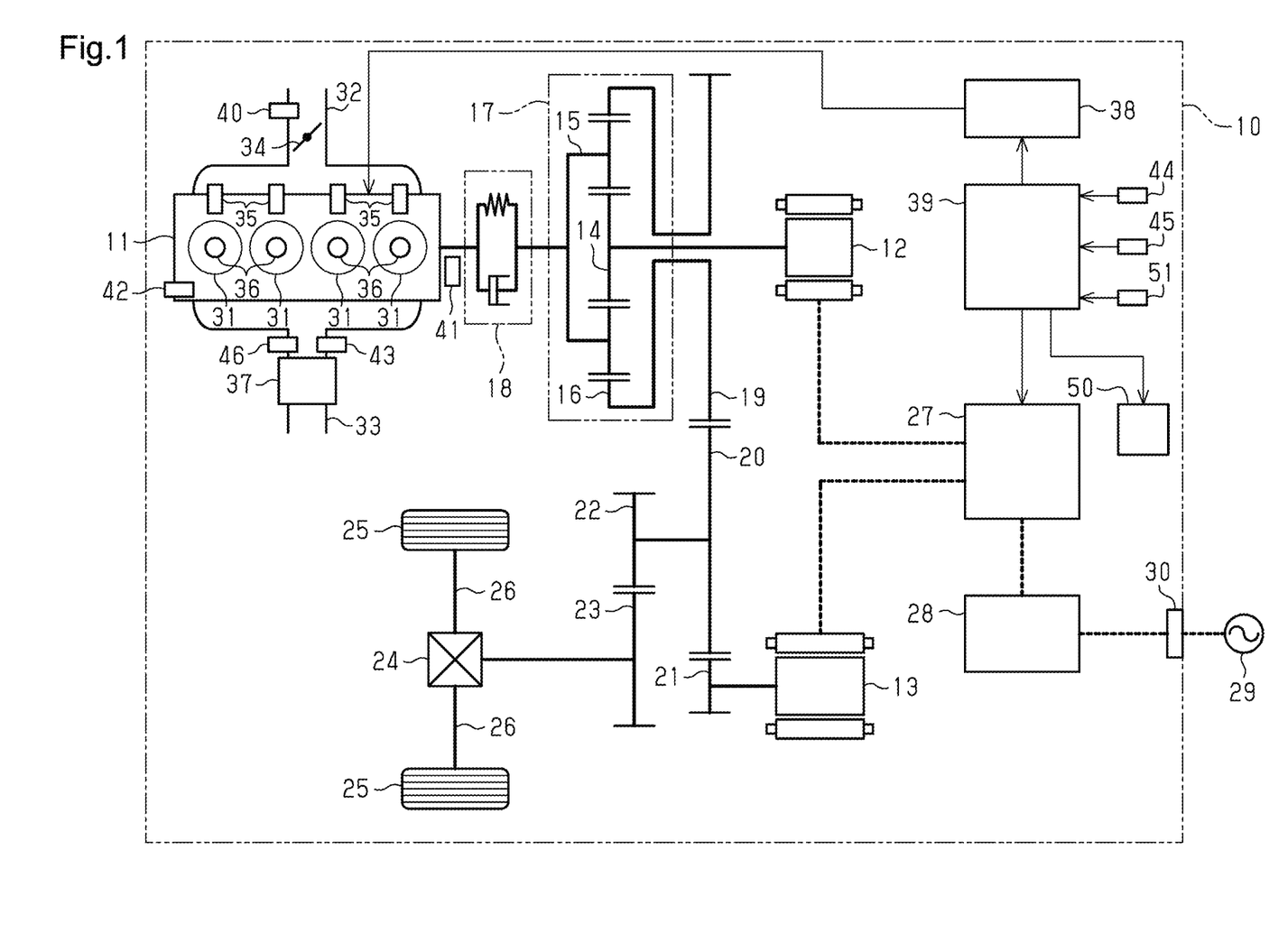
FIG. 1 is a schematic diagram of a controller according to at least one embodiment and a hybrid vehicle that is a control target of the controller.

As shown in FIG. 1, the hybrid vehicle 10 of at least one embodiment includes an engine 11. In the following, the hybrid vehicle 10 will be referred to as a vehicle 10. The vehicle 10 is equipped with a battery 28. The vehicle 10 is equipped with a first motor 12 and a second motor 13. Each of the first motor 12 and the second motor 13 has a motor mode and a generator mode. In the motor mode, power is supplied from the battery 28 to the first motor 12 and/or the second motor 13, and the supplied power is converted into a driving force. That is, the first motor 12 and/or the second motor 13 can drive the vehicle 10. In the generator mode, driving force is supplied to the first motor 12 and/or the second motor 13 from a source other than the first motor 12 and the second motor 13. The battery 28 is charged with the electric power generated by using the supplied driving force.

A planetary gear mechanism 17 is provided on the vehicle 10. The planetary gear mechanism 17 has three rotating elements. That is, the planetary gear mechanism 17 has a sun gear 14, a planetary carrier 15, and a ring gear 16. The engine 11 is connected to the planetary carrier 15 via a transaxle damper 18. The first motor 12 is connected to the sun gear 14. A counter drive gear 19 is integrally provided with the ring gear 16. A counter driven gear 20 is meshed with the counter drive gear 19. Then, the second motor 13 is connected to the reduction gear 21 meshed with the counter driven gear 20.

The final drive gear 22 is integrally rotatably connected to the counter driven gear 20. The final driven gear 23 is meshed with the final drive gear 22. The drive shaft 26 of the wheel 25 is connected to the final driven gear 23 via the differential mechanism 24.

The first motor 12 and the second motor 13 are electrically connected to the battery 28 via the power control unit (PCU) 27. The PCU 27 regulates the amount of power supplied from the battery 28 to the first motor 12 and the second motor 13. The PCU 27 regulates the amount of power supplied to the battery 28 from the first motor 12 and the second motor 13. That is, PCU 27 adjusts the amount of discharge and the amount of charge. The vehicle 10 is provided with a power connector 30 that can be connected to an external power supply 29. Therefore, the battery 28 can be charged by the electric power supplied from the external power source 29. That is, in at least one embodiment, the vehicle 10 is a plug-in hybrid vehicle.

The engine 11 has a plurality of cylinders 31, an intake passage 32, and an exhaust passage 33. Intake air flows through intake passage 32 and flows into each cylinder 31. The air-fuel mixture is burned in each cylinder 31. Exhaust generated by combustion in each cylinder 31 flows through exhaust passage 33. The intake passage 32 is provided with a throttle valve 34, which is a valve for adjusting the flow rate of the intake air flowing through the intake passage 32. A plurality of fuel injection valves 35 for injecting fuel during intake are provided in each of the plurality of cylinders 31. A plurality of spark plugs 36 for igniting a mixture of fuel and intake air by spark discharge are respectively provided in the plurality of cylinders 31. In addition, the exhaust passage 33 is provided with a filter 37 that collects particulate matter (PM) in the exhaust. The filter 37 can remove particulate matter contained in the exhaust. An oxidation catalyst that promotes the oxidation reaction of the collected PM is supported on the surface of the porous material constituting the filter 37. The filter 37 is, for example, a gasoline particulate filter (GPF).

The vehicle 10 is equipped with an engine control unit 38, which is an electronic controller that controls the engine 11. In addition, vehicle 10 is equipped with controller 39, which controls engine control unit 38 and PCU 27 in an integrated manner. That is, controller 39 controls vehicle 10. Each of engine control unit 38 and controller 39 is configured as a computer unit. The computer unit includes Read Only Memory (ROM), Central Processing Unit (CPU), and Random Access Memory (RAM). ROM stores control programs and data. The CPU executes the program stored in the ROM. RAM is the work area when the CPU executes a program.

The detection signal of the air flow meter 40 that detects the intake air amount of the engine 11 is input to the engine control unit 38. The detection signal of the crank angle sensor 41 that detects the rotation angle of the engine 11 is input to the engine control unit 38. The detection signal of the water temperature sensor 42 that detects the temperature of the cooling water of the engine 11 is input to the engine control unit 38. The detection signal of the exhaust temperature sensor 43 that detects the temperature of the exhaust flowing into the filter 37 is input to the engine control unit 38. The engine control unit 38 calculates the rotational speed of the engine 11 (engine rotational speed) based on the detection signal of the crank angle sensor 41. In addition, the engine control unit 38 calculates the engine load factor KL based on the engine rotational speed and the intake air amount. The engine load factor KL will be described. The amount of air flowing into each cylinder 31 in the intake stroke is called the cylinder inflow air amount. The cylinder inflow air amount when the engine 11 is constantly operated with the throttle valve 34 fully open at the current engine rotational speed is defined as a fully-open air amount. The engine load factor KL represents the ratio of the current cylinder inflow air amount to the fully-open air amount.

The current IB, voltage VB, and temperature TB of the battery 28 are input to the controller 39. Then, the controller 39 calculates the state of charge (SOC) of the battery 28 based on the current IB, the voltage VB, and the temperature TB. Further, a detection signal of the accelerator pedal sensor 44 for detecting the accelerator opening ACCP, which is the amount of depression of the accelerator pedal of the driver, is input to the controller 39. The detection signal of the vehicle speed sensor 45 that detects the vehicle speed V, which is the running speed of the vehicle 10, is input to the controller 39. The detection signal of the air-fuel ratio sensor 46 is input to the controller 39. The air-fuel ratio sensor 46 is provided in a portion of the exhaust passage 33 upstream of the filter 37, and detects the oxygen concentration of the gas flowing through the exhaust passage 33. That is, the air-fuel ratio sensor 46 detects the air-fuel ratio of the air-fuel mixture. Then, the controller 39 calculates the vehicle required driving force, which is the required value of the driving force of the vehicle 10, based on the accelerator opening ACCP and the vehicle speed V. The controller 39 calculates the required engine output, which is the required value of the engine output, based on the vehicle required driving force, SOC, and the like. The controller 39 calculates the MG1 required torque, which is the required value of the power running/regenerative torque of the first motor 12, based on the vehicle required driving force, SOC, and the like. The controller 39 calculates the MG2 required torque, which is the required value of the power running/regenerative torque of the second motor 13, based on the vehicle required driving force, SOC, and the like. Then, the running control of vehicle 10 is executed. Specifically, the engine control unit 38 controls the output of the engine 11 according to the required engine output. The PCU 27 controls the torque of the first motor 12 and the second motor 13 according to the MG1 required torque and the MG2 required torque.

Note that controller 39 can switch between CD mode and CS mode as a control mode that defines the control of the engine 11, first motor 12, and second motor 13. In the CD mode, the vehicle 10 runs with the engine 11 stopped. That is, the controller 39 prohibits the operation of the engine 11 in the CD mode and drives the vehicle 10 only by the first motor 12 and the second motor 13. In the CS mode, the vehicle 10 can run with engine 11 running. That is, the controller 39 permits the operation of the engine 11 in the CS mode and drives the vehicle 10 using the engine 11, the first motor 12, and the second motor 13. The controller 39 automatically switches between the CD mode and the CS mode based on the accelerator opening ACCP, vehicle speed V, SOC, etc. For example, the controller 39, in principle, selects CD mode as the control mode when the SOC is 30% or higher. In principle, the controller 39 selects CS mode as the control mode when the SOC is less than 30%. During the CS mode, the controller 39 can control engines 11, first motor 12, and second motor 13 to maintain SOC at a given control center value (e.g., 20%). The controller 39 sets "0" as the value of the request engine output in the CD mode. The controller 39 calculates a positive value as the value of the request engine output in the CS mode. Then, the engine control unit 38 stops the operation of the engine 11 when the value of the requested engine output is switched from a positive value to "0". The engine control unit 38 starts the engine 11 when the requested engine output value switches from "0" to a positive value. In this way, the controller 39 is able to switch between the CD mode and the CS mode.

The controller 39 executes a filter regeneration process. The filter regeneration process removes PM deposited on filter 37 by raising the temperature of filter 37 to a temperature at which PM self-combusts. In at least one embodiment, the controller 39 raises the temperature of the filter 37 in the exhaust passage 33 by increasing the load on the engine 11 and raising the temperature of the exhaust. Specifically, the controller 39 increases the load on the engine 11 by increasing the SOC target value in the CS mode. For example, as the SOC target value increases, the chances of using the engine 11 to generate electricity increase, and the load on the engine 11 increases. For example, as the SOC target value increases, the power consumption of the first motor 12 and the second motor 13 is suppressed. As a result, the load on the engine 11 can be increased to compensate for the decrease in output from the first motor 12 and the second motor 13.

The controller 39 can notify the user of the regeneration of the filter 37 through the notification unit 50. The notification unit 50 may be, for example, a display such as a meter and a navigation system. The notification unit 50 may be, for example, a speaker. The user can respond to the notification through the input unit 51 such as the touch panel and the button.

Figure 2:
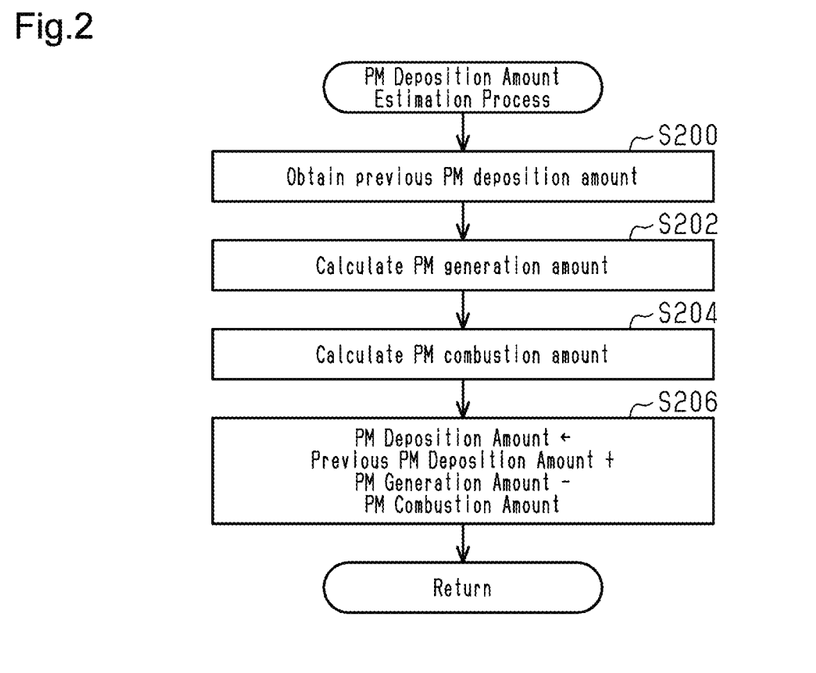
FIG. 2 is a flowchart of a PM deposition amount estimation process executed by the controller in FIG. 1 according to at least one embodiment.

A PM deposition amount estimation process for estimating the deposition amount of the particulate matter deposited in the filter 37 will be described with reference to FIG. 2. The controller 39 repeatedly executes the PM deposition amount estimation process at a predetermined cycle. The first letter S of the reference numerals means a step. The controller 39 obtains the previous PM deposition amount (S200). The controller 39 calculates the PM generation amount (S202). The controller 39 calculates the PM combustion amount (S204). The controller 39 updates the PM deposition amount by adding the difference obtained by subtracting the PM combustion amount from the PM generation amount to the previous PM deposition amount (S206).

The PM generation amount is the amount of PM generated by the combustion of the air-fuel mixture in the cylinder 31. The controller 39 calculates the PM generation amount from the operating state of the engine 11, specifically the intake air amount, the fuel injection amount, and the like.

The PM combustion amount is the amount of PM burned in the filter 37. The higher the temperature of the gas flowing into the filter 37, the higher the temperature of the filter 37. Therefore, the temperature of the filter 37 can be obtained from the temperature detected by the exhaust temperature sensor 43. The controller 39 estimates the filter temperature, which is the temperature of the filter 37, using the heat balance model of the filter 37 based on the temperature and flow rate of the gas flowing into the filter 37 and the temperature of the outside air. The flow rate of the gas flowing into the filter 37 can be obtained from the intake air amount and the fuel injection amount, and the intake air temperature detected by the air flow meter 40 can be used as the temperature of the outside air. When a gas containing oxygen flows into the filter 37 while the filter temperature is equal to or higher than the catalytic activity temperature, the PM deposited on the filter 37 burns. Since oxygen is required for combustion of PM, the amount of PM burned in the filter 37 at this time is determined according to the amount of oxygen in the gas flowing into the filter 37. The oxygen concentration of the gas flowing into the filter 37 can be obtained from the detection result of the air-fuel ratio sensor 46. Therefore, the controller 39 calculates the PM combustion amount based on the gas temperature detected by the exhaust temperature sensor 43, the oxygen concentration detected by the air-fuel ratio sensor 46, the intake air amount, and the fuel injection amount.

Figure 3:
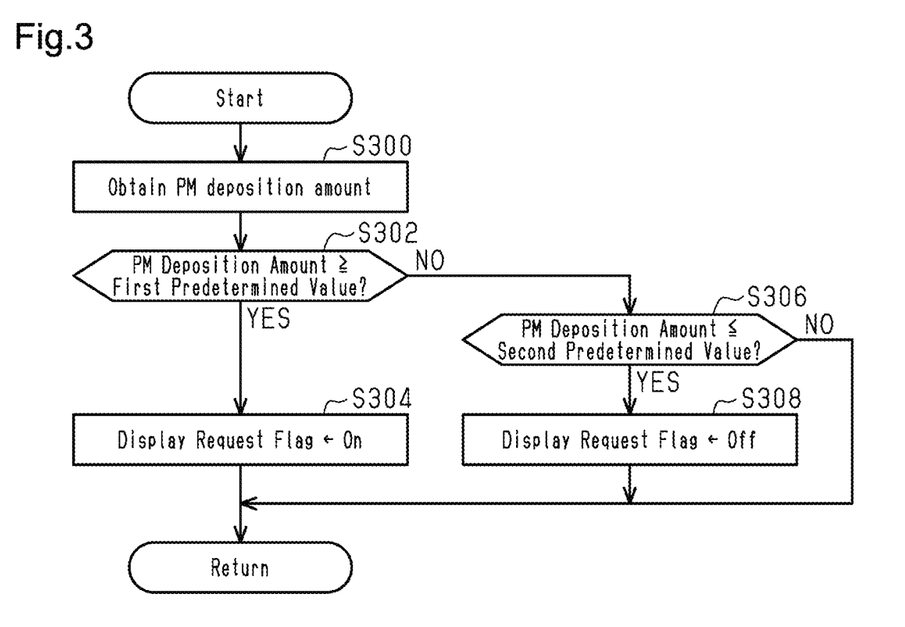
FIG. 3 is a flowchart of a process for setting a display request flag according to the PM deposition amount estimated by the PM deposition amount estimation process in FIG. 2 according to at least one embodiment.

The process for setting the display request flag according to the PM deposition amount will be described with reference to FIG. 3. The controller 39 repeatedly executes such processing at a predetermined cycle. As will be described later with reference to FIG. 4, the fact that the display request flag is on is a prerequisite for executing the display process. The display process is a process of notifying the regeneration of the filter 37 through the notification unit 50, and the details will be described later.

The controller 39 obtains the PM deposition amount (S300). The controller 39 determines whether the PM deposition amount is greater than or equal to the first predetermined value (S302). The "first predetermined value" corresponds to the "predetermined amount". A PM deposition amount greater than or equal to the first predetermined value means that the user should take action to regenerate the filter 37. The controller 39 proceeds to S304 when the PM deposition amount is greater than or equal to the first predetermined value (S302: Yes). The controller 39 sets the display request flag to on (S304) and ends this flow.

The controller 39 proceeds to S306 when the PM deposition amount is less than the first predetermined value (S302: No). The controller 39 proceeds to S308 when the PM deposition amount is less than or equal to the second predetermined value (S306: Yes). The second predetermined value is a value smaller than the first predetermined value, and the on/off switching of the display request flag is set to have hysteresis. The controller 39 turns off the display request flag (S308) and ends this flow. When the PM deposition amount is larger than the second predetermined value (S306: No), the controller 39 ends this flow without switching on/off of the display request flag.

Figure 4:
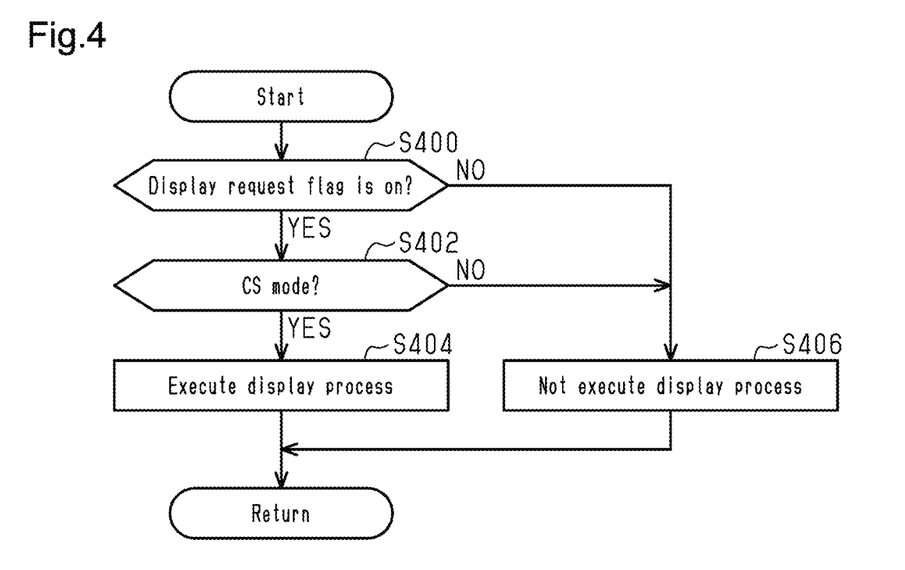
FIG. 4 is a flowchart of a process of determining whether or not to execute a display process with reference to the display request flag in FIG. 3 according to at least one embodiment.

The process of determining whether or not to execute the display process will be described with reference to FIG. 4. The controller 39 repeatedly executes such processing at a predetermined cycle.

The controller 39 first determines whether the display request flag is on (S400). The controller 39 proceeds to S402 when the display request flag is on (S400: Yes). The controller 39 determines whether the control mode is CS mode (S402). The controller 39 proceeds to S404 when the control mode is CS mode (S402: Yes). The controller 39 executes the display process (S404). That is, the controller 39 executes the display process when the display request flag is on and the control mode is CS mode. As described above, the display request flag is on when the estimated PM deposition amount is greater than or equal to the first predetermined value. Therefore, the controller 39 executes the display process when the control mode is CS mode if the estimated PM deposition amount is greater than or equal to the first predetermined value.

The controller 39 proceeds to S406 when the control mode is CD mode (S402: No). The controller 39 does not execute the display process (S406). That is, the controller 39 does not execute the display process when the display request flag is on and the control mode is CD mode. Therefore, the controller 39 does not execute the display process when the control mode is CD mode even if the estimated PM deposition amount is greater than or equal to the first predetermined value. "Not execute display process" can mean to erase the display process that was executed immediately before.

The display process is the process that notifies the user that the filter 37 needs to be regenerated. For example, the display process notifies the user of the desired driving pattern. Specifically, the display process notifies the user of the desired vehicle speed, the desired driving time and driving distance, the desired warm-up time, and the like. The display process may notify the user to refer to a manual that describes the desired driving pattern. When the user drives the vehicle 10 in the desired driving pattern, the temperature of the exhaust discharged from the engine 11 rises. As a result, the temperature of the filter 37 provided in the exhaust passage 33 rises, and the particulate matter in the filter 37 burns. This removes the particulate matter from the filter 37. That is, the filter 37 is regenerated.

Alternatively, the display process may recommend the execution of the filter regeneration process described above. For example, the display process may inquire of the user whether to permit the execution of the filter regeneration process.

As described above, regenerating the filter 37 is premised on the engine 11 being running. The operation of the engine 11 is prohibited in the CD mode. Therefore, the filter 37 cannot be regenerated by using the engine 11 in the CD mode. Therefore, if the user is notified to perform the regeneration of the filter 37 using the engine 11 in the CD mode, the user may feel uneasy. As mentioned above, the controller 39 does not execute the display process when the control mode is the CD mode even if the estimated PM deposition amount is greater than or equal to the first predetermined value. As a result, the user's anxiety caused by the display process can be suppressed.

The operation of at least one embodiment will be described.

When the control mode is CS mode, combustion can occur in engine 11. Therefore, when the control mode is the CS mode, the exhaust discharged from the engine 11 may increase the PM deposition amount. On the other hand, when the control mode is the CD mode, the engine 11 does not burn and the PM deposition amount does not increase.

Therefore, the PM deposition amount increases and exceeds the first predetermined value when the control mode is CS mode, not when the control mode is in CD mode. When the PM deposition amount increases and exceeds the first predetermined value, the display request flag is turned on (S304) and the display process is executed (S404).

The control mode may switch to CD mode before the display request flag switches from on to off. In this case, the display process will not be executed even though the display request flag is on (S406). That is, in this case, the display process that was being executed in the CS mode is stopped when the control mode is switched to the CD mode, and the display is turned off.

The effect of at least one embodiment will be described.

(1) The use of the engine 11 is limited in the CD mode as compared to the CS mode. Therefore, sufficiently regenerating the filter 37 by using the engine 11 in the CD mode is difficult. Therefore, when the user is notified that the filter 37 needs to be regenerated in the CD mode, the user may feel uneasy. That is, if the user is notified that the filter 37 needs to be regenerated in a situation where sufficient regeneration of the filter 37 is difficult, the user may feel uneasy. In the above configuration, in the CD mode, even if the estimated PM deposition amount is greater than or equal to the first predetermined value, a notification is not displayed to the user that the filter 37 needs to be regenerated. Therefore, suppression of the user's anxiety that may occur due to the display process being executed on the user in the CD mode is possible.

(2) The operation of engine 11 is prohibited in the CD mode. Therefore, in the CD mode, using engine 11 to remove particulate matter from filter 37 is not possible. The hybrid vehicle controller according to the present disclosure is particularly useful when the control mode includes the CD mode.

The process according to at least one embodiment will be described with reference to FIGS. 5 and 6. In at least one embodiment, if the control mode is switched from the CS mode to the CD mode while the display request flag is on, the display process is immediately stopped. On the other hand, in at least one embodiment, when the control mode is switched from the CS mode to the CD mode while the display request flag is on, the controller 39 inquires of the user whether to permit the regeneration of the filter 37. And if the user does not permit the regeneration of the filter 37, the display process will not be executed. The display process is the same process as the display process described above.

Figure 5:
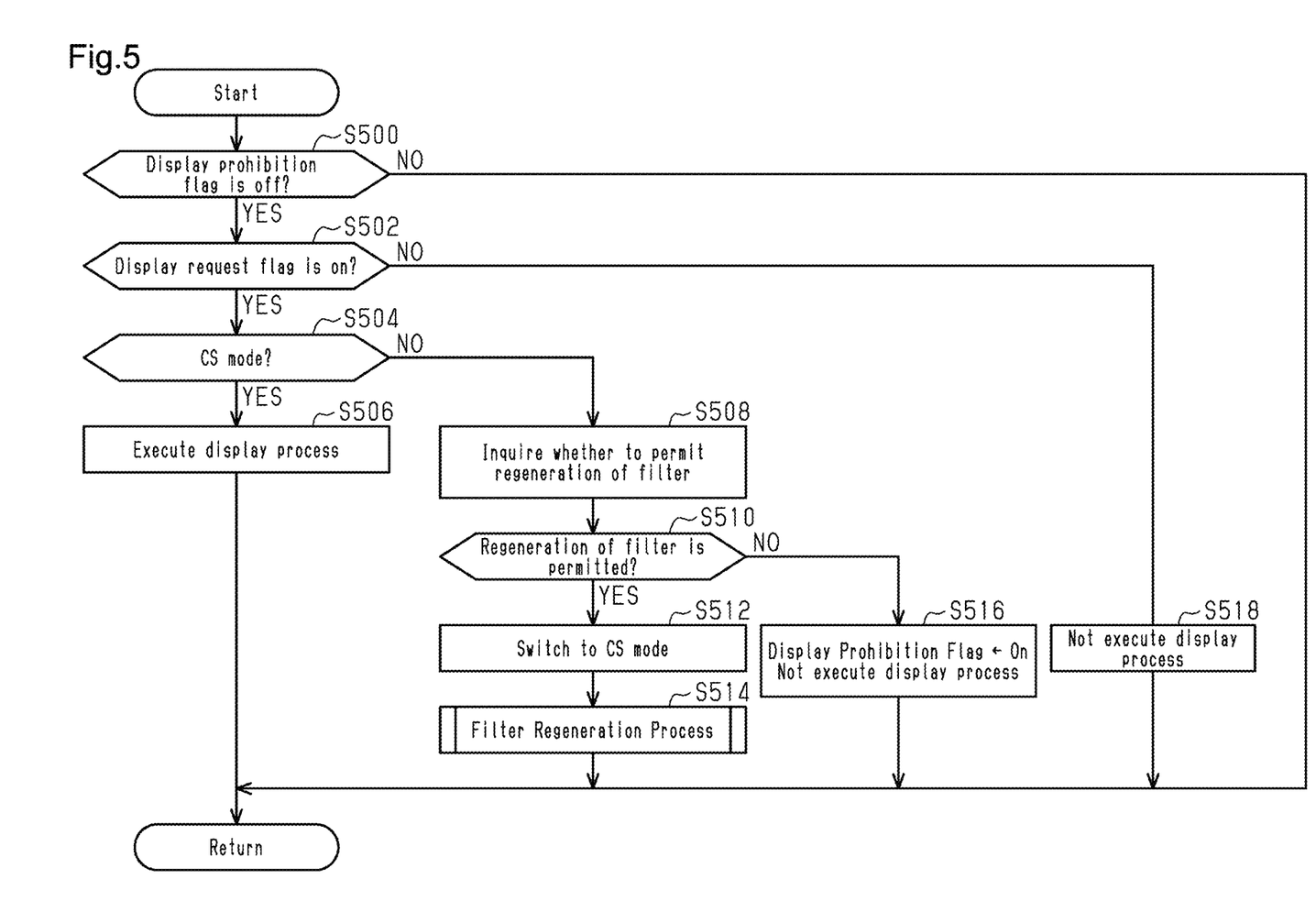
FIG. 5 is a flowchart showing a process executed by the controller according to at least one embodiment.

The controller 39 repeatedly executes the process shown in FIG. 5 at a predetermined cycle.

The controller 39 determines whether the display prohibition flag is off (S500). The display prohibition flag is off by default. When the display prohibition flag is turned on in S516, the display prohibition flag is turned off through the process shown in FIG. 6. The controller 39 proceeds to S502 if the display prohibition flag is off (S500: Yes). The controller 39 ends this flow when the display prohibition flag is not off (S500: No). That is, when the display prohibition flag is on, the processes of S502 to S518 are not executed.

The controller 39 determines whether the display request flag is on (S502). The controller 39 proceeds to S504 if the display request flag is on (S502: Yes). The controller 39 proceeds to S518 if the display request flag is not on (S502: No). The controller 39 does not execute the display process (S518) and ends this flow.

The controller 39 determines whether the control mode is CS mode (S504). The controller 39 proceeds to S506 if control mode is CS mode (S504: Yes). The controller 39 executes the display process (S506) and ends this flow. The controller 39 proceeds to S508 if the control mode is not CS mode (S504: No).

The controller 39 inquires of the user whether to permit the regeneration of the filter 37 (S508). That is, the controller 39 inquires of the user whether to permit the regeneration of the filter 37 when the controller 39 determines that the estimated PM deposition amount is greater than or equal to the first predetermined value and the control mode is the CD mode. This corresponds to the processes of S502, S504, and S508. The controller 39 then proceeds to S510.

The controller 39 determines whether or not the controller 39 has received an input from the user indicating that the regeneration of the filter 37 is permitted (S510). When the controller 39 receives an input from the user indicating that the regeneration of the filter 37 is permitted (S510: Yes), the controller 39 proceeds to S512 and switches the control mode to CS mode. Next, controller 39 proceeds to S514, executes the filter regeneration process described above, and ends this flow. The filter regeneration process may be continued until the display request flag is turned off. When the controller 39 receives the input from the user indicating that the regeneration of filter 37 is not permitted (S510: No), the controller 39 proceeds to S516, prohibits the display process, and ends this flow. Prohibiting the display process means turning on the display prohibition flag and not executing the display process.

The process for turning off the display prohibition flag, which is executed on the condition that the display prohibition flag is turned on, will be described with reference to FIG. 6.

The controller 39 sets the counter value i to 0 (S600) and proceeds to S602. The controller 39 increments the counter value i (S602) and proceeds to S604. The controller 39 determines whether the counter value i has reached the determination value N (S604). If the counter value i has not reached the determination value N (S604: No), the controller 39 proceeds to S602 and continues processing. The controller 39 proceeds to S606 when the counter value i reaches the determination value N (S604: Yes). The controller 39 turns off the display prohibition flag (S606) and ends this flow.

In this way, when the predetermined time elapses from the time when the display prohibition flag is turned on, the display prohibition flag is switched from on to off. The predetermined time corresponds to the time required to repeat the process of S602 N times. If the user does not permit the regeneration of filter 37 (S510: No), the display prohibition flag is on (S516). From the time when the display prohibition flag is turned on until the predetermined time elapses, the process of S508 that inquires of the user whether to permit the regeneration of the filter 37 is not executed.

The operation of at least one embodiment will be described.

The PM deposition amount increases and exceeds the first predetermined value when the control mode is CS mode, not when the control mode is in CD mode. When the PM deposition amount increases and exceeds the first predetermined value, the display request flag is turned on (S304) and the display process is executed (S506).

The control mode may switch to CD mode before the display request flag switches to off. In such a case, the controller 39 inquires of the user whether to permit the regeneration of filter 37 (S508). When controller 39 receives an input from the user indicating that the regeneration of filter 37 is not permitted (S510: No), the controller 39 proceeds to S516 and prohibits the display process. Therefore, the controller 39 inquires of the user whether to permit the regeneration of filter 37 when the control mode switches from the CS mode to the CD mode while the display request flag is on.

The effect of at least one embodiment will be described. According to at least one embodiment, in addition to the effects (1) and (2) described above, the following effects can be obtained.

(3) When the PM deposition amount is greater than or equal to the first predetermined value in the CD mode, the user may permit the regeneration of the filter 37. In such a case, the controller 39 switches the control mode to the CS mode to increase the operating opportunity of the engine 11. This can regenerate the filter 37.

(4) When the PM deposition amount is greater than or equal to the first predetermined value in the CD mode, the user may not permit the regeneration of the filter 37. In such a case, the controller 39 prohibits the display process. Therefore, when the user does not intend to regenerate the filter 37, the discomfort caused by the display process can be suppressed.

The above embodiments may be modified and implemented as follows. The above embodiments and the following modifications can be implemented in combination with each other to the extent that they are technically consistent.

In the embodiments described above, the vehicle 10 includes a first motor 12 and a second motor 13. However, the number of motors to drive the vehicle 10 is variable.

In the embodiments described above, the vehicle 10 is a plug-in hybrid vehicle. However, this is only an example, and the vehicle 10 may be a hybrid vehicle. That is, the power connector 30 that can be connected to the external power supply 29 can be omitted.

In the embodiments described above, the controller 39 can switch between the CD mode and the CS mode as the control mode that defines the control of the engine 11, the first motor 12, and the second motor 13. However, this is only an example. Instead of the CD mode, the controller 39 may have a first mode that limits the use of the engine 11 to the extent that the engine 11 cannot be used to sufficiently regenerate the filter 37. Instead of the CS mode, the controller 39 may have a second mode that allows the use of the engine 11 to the extent that the engine 11 can be used to regenerate the filter 37. That is, the controller 39 may have the first mode in which the use of the engine 11 is limited as compared with the second mode. The controller 39 may have the first mode in which the output of the engine 11 is limited as compared with the second mode. For example, as the first mode, an economy mode in which the output of the engine 11 is limited to reduce fuel consumption can be considered. The controller 39 may partially regenerate the filter 37 in the economy mode.

In the embodiments described above, the controller 39 automatically switches between the CD mode and the CS mode based on the accelerator opening ACCP, vehicle speed V, SOC, and the like. However, this is only an example. For example, the user may determine the control mode.

In at least one embodiment described above, controller 39 does not execute the display process when the control mode is the CD mode. Further, the controller 39 may execute a process of displaying that the filter 37 cannot be regenerated when the control mode is the CD mode.

In the embodiments described above, the controller 39 executes the filter regeneration process by increasing the load on the engine 11 by increasing the SOC target value in the CS mode. However, this is only an example. The filter regeneration process may be a control that can remove particulate matter from the filter 37 using the engine 11. For example, in the filter regeneration process, the filter 37 may be heated through the dither control. In dither control, some of the plurality of cylinders 31 are set as rich cylinders, and the remaining cylinders are set as lean cylinders. Here, in the rich cylinder, combustion is performed at an air-fuel ratio lower than the stoichiometric air-fuel ratio. In the lean cylinder, combustion is performed at an air-fuel ratio higher than the stoichiometric air-fuel ratio. The exhaust from the lean cylinder containing a large amount of excess oxygen flows into the filter 37, and the oxygen in the filter 37 increases. Next, the exhaust from the rich cylinder containing a large amount of unburned fuel flows into the filter 37, and the unburned fuel is burned. This promotes the temperature rise of the filter 37.

Such dither control is executed when the dither control execution permission condition is satisfied. The dither control execution permission condition is satisfied when, for example, the integrated value InG of the intake air amount after the engine 11 is started is greater than or equal to the threshold value InGth. The execution permission condition is a condition for determining that the temperature at the upstream end of the filter 37 has reached the catalytic activity temperature. The execution permission condition is a condition for promoting the reaction between the unburned fuel component or the incomplete combustion component flowing out from the rich combustion cylinder and the oxygen flowing out from the lean combustion cylinder, and effectively raising the temperature of the filter 37. In addition, the integrated value InG is used as an amount having a correlation with the total amount of heat energy generated by the combustion of the air-fuel mixture in the combustion chamber after the start of the engine 11. Further, the dither control may be executed in a period until the filter 37 reaches the catalytically active temperature throughout.

In addition to the above, the filter regeneration process may be executed through a single cylinder fuel cut. In this case, the cylinder on which the fuel cut is performed corresponds to the lean cylinder in the dither control. The filter regeneration process may be carried out through a process of retarding the ignition timing. The filter regeneration process may be carried out through a process of increasing the air-fuel ratio while keeping the fuel constant. The filter regeneration process may be executed through a process that suppresses exhaust gas recirculation (EGR). The filter regeneration process may be executed through a process of raising the lower limit of the engine rotational speed. The controller 39 may regenerate the filter 37 by instructing the engine 11 to increase a contribution of a torque of the engine 11 to a driving torque of the vehicle 10 during the filter regeneration process as compared to the case where the filter is not regenerated. The contribution of the torque of the engine 11 to drive torque may be increased by selecting a mode in which engine 11 is actively used and changes in engine rotational speed are more likely to be reflected in vehicle speed V.

In at least one embodiment, when the controller 39 receives the input from the user indicating that the regeneration of the filter 37 is permitted, the controller 39 switches the vehicle 10 to the CS mode and execute the filter regeneration process. This may be changed as follows. The controller 39 may switch vehicle 10 to CS mode when it receives the input from the user indicating that the regeneration of the filter 37 is permitted. Then, the controller 39 may notify the user of the desired driving pattern. That is, the filter regeneration process may be omitted.

Figure 6:
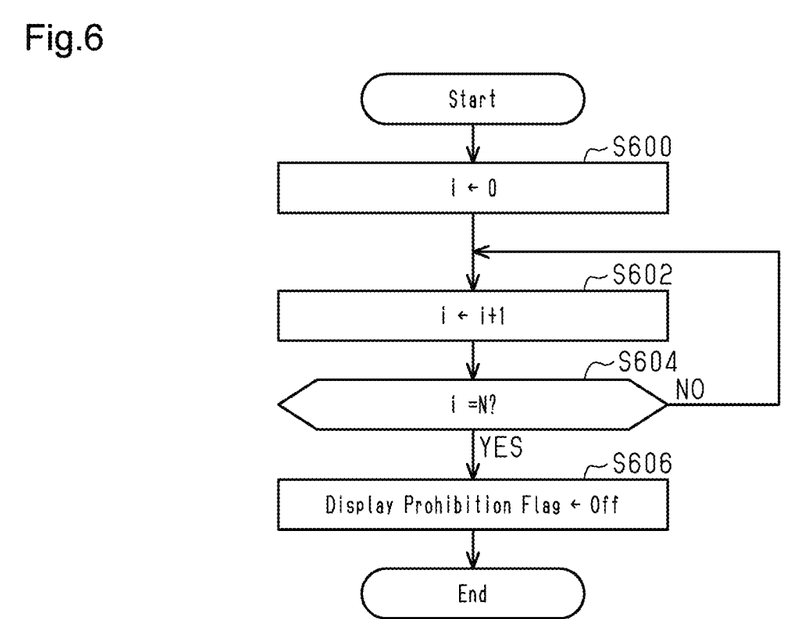
FIG. 6 is a flowchart of a process for turning off the display prohibition flag, which is executed on condition that the display prohibition flag in FIG. 5 is turned on according to at least one embodiment.

In at least one embodiment, the display prohibition flag is turned on and then turned off when the predetermined time elapses (see FIG. 6). However, this is only an example. For example, the display prohibition flag may be turned off when the control mode switches to CS mode.

In at least one embodiment, the controller 39 switches the control mode from the CD mode to the CS mode, executes the filter regeneration process, and completes the flow (S512 and S514). The controller 39 may terminate the filter regeneration process and switch the control mode from CS mode to CD mode, provided that the display request flag is off.

In the embodiments described above, the controller 39 includes a CPU, ROM, and RAM, and executes software processing. However, this is only an example. For example, the controller 39 may include a dedicated hardware circuit (e.g., ASIC, etc.) that processes at least part of the software processing executed in the above embodiment. That is, the controller 39 may have any of the following configurations (a) to (c). (a) The controller 39 includes a processing device that executes all processing according to the program, and a program storage device such as a ROM that stores the program. That is, the controller 39 includes a software execution device. (b) The controller 39 includes a processing device that executes a part of processing according to a program and a program storage device. In addition, the controller 39 has a dedicated hardware circuit to execute the rest of the processing. (c) The controller 39 is equipped with a dedicated hardware circuit that executes all processing. Here, there may be a plurality of software execution devices and/or dedicated hardware circuits. That is, the processing may be executed by processing circuitry including at least one of the software execution devices or the dedicated hardware circuits. There may be a plurality of software execution devices and dedicated hardware circuits included in the processing circuitry. A program storage device or computer-readable medium includes any available medium accessible by a general purpose or dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A hybrid vehicle controller configured to control a hybrid vehicle including an engine including a filter configured to remove a particulate matter (PM) contained in an exhaust and a motor configured to drive the hybrid vehicle, the hybrid vehicle controller comprising:

processing circuitry, wherein the processing circuitry is configured to:
execute a PM deposition amount estimation process that estimates a deposition amount of PM deposited in the filter,
switch between a first mode and a second mode as a control mode that defines control of the engine and the motor, wherein a use of the engine is limited in the first mode as compared with the second mode,
execute a display process that notifies a user that the filter needs to be regenerated when the control mode is the second mode if the estimated deposition amount is greater than or equal to a predetermined amount, and not to execute the display process when the control mode is the first mode even if the deposition amount is greater than or equal to the predetermined amount.

2. The hybrid vehicle controller according to claim 1, wherein
the processing circuitry is further configured to:
inquire of the user whether or not to permit a regeneration of the filter when the processing circuitry determines that the estimated deposition amount is greater than or equal to the predetermined amount and the control mode is the first mode,
switch the control mode to the second mode when the processing circuitry receives an input from the user indicating that the regeneration of the filter is permitted.

3. The hybrid vehicle controller according to claim 2, wherein
the processing circuitry is further configured to prohibit the display process when the processing circuitry receives an input from the user indicating that the regeneration of the filter is not permitted.

4. The hybrid vehicle controller according to claim 1, wherein
the processing circuitry is further configured to regenerate the filter by instructing the engine to increase a contribution of a torque of the engine to a driving torque of the hybrid vehicle when the filter is regenerated than when the filter is not regenerated.

5. The hybrid vehicle controller according to claim 1, wherein
the processing circuitry is further configured to:
prohibit operation of the engine in the first mode and drive the hybrid vehicle only by the motor, and
permit operation of the engine in the second mode to drive the hybrid vehicle.

6. A hybrid vehicle comprising:
an engine configured to drive the hybrid vehicle;
a filter configured to remove particulate matter (PM) contained in an exhaust from the engine;
a motor configured to drive the hybrid vehicle; and
a controller comprising processing circuitry, wherein the processing circuitry is configured to:
execute a PM deposition amount estimation process that estimates a deposition amount of the PM deposited in the filter,
switch between a first mode and a second mode as a control mode that defines control of the engine and the motor, wherein an output of the engine is limited in the first mode as compared with the second mode,
execute a process that notifies a user that the filter needs to be regenerated when the control mode is the second mode if the estimated deposition amount is greater than or equal to a predetermined amount, and does not notify the user when the control mode is the first mode even if the deposition amount is greater than or equal to the predetermined amount.

7. A hybrid vehicle controller comprising:
processing circuitry, wherein the processing circuitry is configured to:
execute a particulate matter (PM) deposition amount estimation process that estimates a deposition amount of PM deposited in a filter,
switch between a first mode and a second mode as a control mode that defines control of an engine and a motor, wherein an output of the engine is limited in the first mode as compared with the second mode,
execute a process that notifies a user that the filter needs to be regenerated when the control mode is the second mode if the estimated deposition amount is greater than or equal to a predetermined amount, and does not notify the user when the control mode is the first mode even if the deposition amount is greater than or equal to the predetermined amount.

* * * * *